(12) United States Patent
Kraus et al.

(10) Patent No.: US 11,414,018 B2
(45) Date of Patent: Aug. 16, 2022

(54) CUSTOM MOLDED CONTAINER FOR LAND VEHICLE

(71) Applicant: Sonoco Development, Inc., Hartsville, SC (US)

(72) Inventors: Carl Edwin Kraus, Hartsville, SC (US); Jon Scott Novak, Naperville, IL (US); James Lowry, Franklin, TN (US)

(73) Assignee: Sonoco Development, Inc., Hartsville, SC (US)

( * ) Notice: Subject to any disclaimer, the term of this patent is extended or adjusted under 35 U.S.C. 154(b) by 139 days.

(21) Appl. No.: 17/077,714

(22) Filed: Oct. 22, 2020

(65) Prior Publication Data

US 2022/0126755 A1 Apr. 28, 2022

(51) Int. Cl.
*B60R 5/04* (2006.01)

(52) U.S. Cl.
CPC ...................... *B60R 5/04* (2013.01)

(58) Field of Classification Search
CPC ....................................................... B60R 5/04
USPC ....................................................... 296/37.5
See application file for complete search history.

(56) References Cited

U.S. PATENT DOCUMENTS

| | | | |
|---|---|---|---|
| 4,944,544 A | 7/1990 | Dick | |
| 5,167,433 A * | 12/1992 | Ryan | B60R 7/02 296/39.1 |
| 5,289,941 A * | 3/1994 | Blankenburg | B60R 7/02 206/821 |
| 5,324,089 A | 6/1994 | Schlachter | |
| 5,469,999 A | 11/1995 | Phirippidis | |
| 5,669,537 A | 9/1997 | Saleem et al. | |
| 6,149,040 A * | 11/2000 | Walker | B60R 7/02 224/42.32 |
| 6,241,134 B1 | 6/2001 | Dunkel | |
| 6,241,137 B1 | 6/2001 | Corr | |
| 6,481,773 B1 | 11/2002 | Salani et al. | |
| D481,351 S | 10/2003 | Brooks | |
| 8,128,126 B2 * | 3/2012 | Poupore | F16L 21/06 285/373 |
| 9,490,461 B2 | 11/2016 | Lucas et al. | |
| 10,773,654 B2 * | 9/2020 | Adrain | B60R 7/14 |
| 11,066,020 B2 * | 7/2021 | Reyes Marcial | B62D 25/087 |
| 2007/0039957 A1 | 2/2007 | Shulz et al. | |
| 2008/0257927 A1 | 10/2008 | Feick | |
| 2014/0354003 A1 | 12/2014 | Murray et al. | |

* cited by examiner

*Primary Examiner* — Pinel E Romain
(74) *Attorney, Agent, or Firm* — von Briesen & Roper, s.c.

(57) ABSTRACT

A container that can be installed and removed from the storage area of a land vehicle. The container rests on the load floor and defines one or more compartments for storing goods. The lid allows for storage on op of the container. The container has outward dimensions that engage the land vehicle to prevent the container from substantially moving in either a lateral or forward/rearward direction.

20 Claims, 5 Drawing Sheets

CUSTOM MOLDED CONTAINER FOR LAND VEHICLE

TECHNICAL FIELD

This disclosure relates to container for a land vehicle. More particularly, this disclosure relates to a container custom molded to fit in the rear storage area of a land vehicle such as a sport utility vehicle.

BACKGROUND

Currently available coolers are not integrated into the land vehicle in which they are stored. Consequently, the cooler can slide around the rear storage area or trunk area of a vehicle. In addition, the combination cooler and vehicle do not have a clean, integrated look.

The present disclosure is designed to address the problems described above.

SUMMARY OF THE DISCLOSURE

In one aspect of the present disclosure, a storage system for a land vehicle is disclosed. The storage system may include a storage area disposed in the land vehicle behind a passenger area, the storage area defined by a load floor, a roof, a first laterally opposing side, a second laterally opposing side, a rear seat and a rear ledge, and a container comprising a body and a lid configured to engage the body in sealing relationship therewith, the body defining an interior of the container providing storage space. The body may have a forward portion located toward the passenger area and a rearward portion located away from the passenger area, the body may be configured to rest on the load floor and to fit between the first laterally opposing side and the second laterally opposing side of the storage area, and the body may have outward dimensions so that the body is prevented from moving in an axial direction and a lateral direction when the container is installed within the storage area.

In another aspect of the present disclosure, a container for a land vehicle is disclosed. The land vehicle may have a storage area disposed in the land vehicle behind a passenger area, the storage area being defined by a load floor, a roof, a first laterally opposing side, a second laterally opposing side, a rear seat and a rear ledge. The container may include a body having a first sidewall, a second sidewall opposite the first sidewall, a front side and a rear side, and defining an interior of the container providing storage space. The body may be configured to rest on the load floor and to fit between the first laterally opposing side and the second laterally opposing side of the storage area with the front side disposed proximate the rear seat and the rear side disposed near the rear ledge, and the body may have outward dimensions so that the body is prevented from moving in an axial direction and a lateral direction when the container is installed within the storage area. The container may further include a lid pivotally connected to the body at the front side and configured to engage the body in sealing relationship therewith.

In a further aspect of the present disclosure, a container for a land vehicle is disclosed. The land vehicle may have a storage area disposed in the land vehicle behind a passenger area, and the storage area may be defined by a load floor, a roof, a first laterally opposing side, a second laterally opposing side, a rear seat and a rear ledge. The first laterally opposing side may have a first wheel well extending inward therefrom and may have a first laterally inward surface and a first rearward surface proximate the rear ledge. The container may include a body having a first sidewall, a second sidewall opposite the first sidewall, a front side and a rear side, and defining an interior of the container providing storage space. The first sidewall may have a first lateral extension projecting laterally therefrom, wherein the body is configured to rest on the load floor and to fit between the first laterally opposing side and the second laterally opposing side of the storage area with the front side disposed proximate the rear seat and the rear side disposed near the rear ledge, the first lateral extension may engage the first laterally opposing side and the second sidewall engages the second laterally opposing side to prevent lateral movement of the body within the storage area, and the first lateral extension may project laterally past the first wheel well and engage the first rearward surface to prevent axially forward movement of the container within the storage area. The container may further include a lid pivotally connected to the body at the front side and configured to engage the body in sealing relationship therewith.

Additional aspects are defined by the claims of this patent.

DETAILED DESCRIPTION

Figure 1:
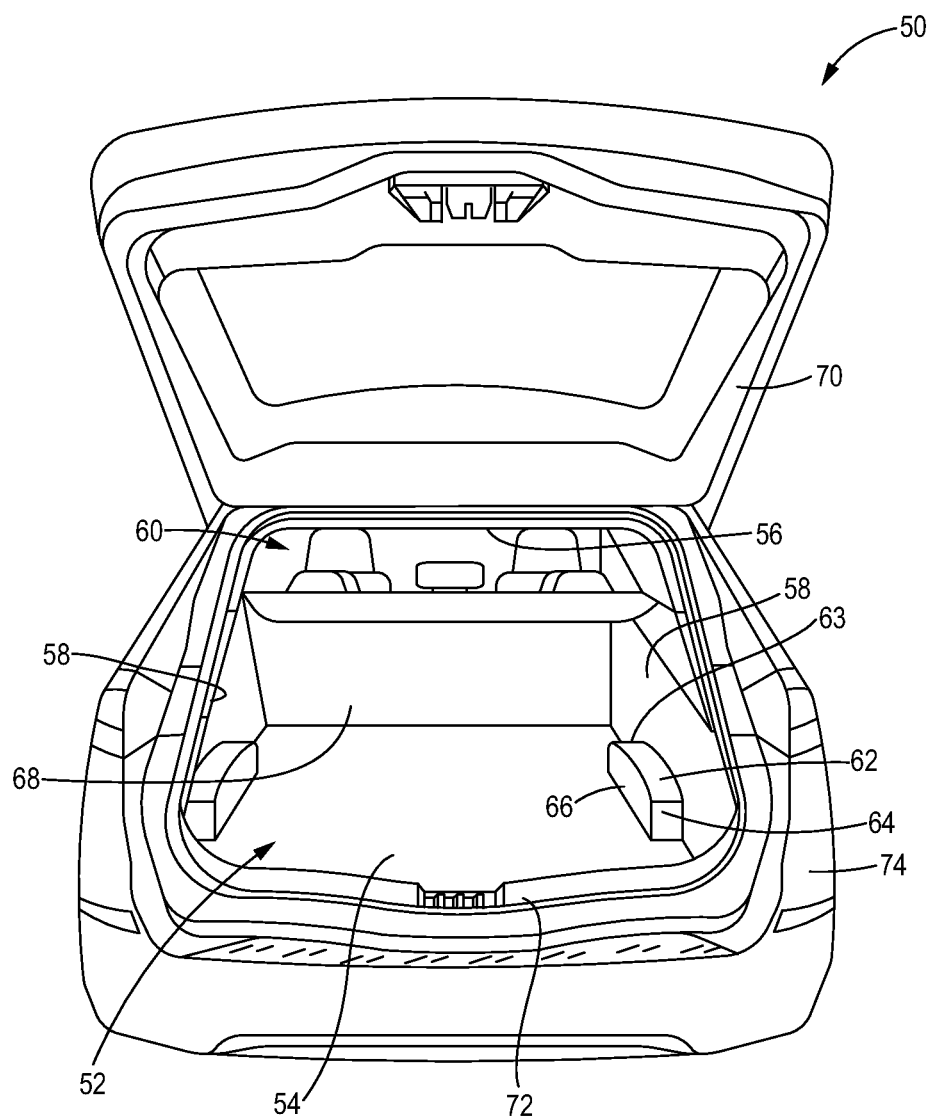
FIG. 1 is a rear perspective view of a land vehicle.

While the invention described herein may be embodied in many forms, there is shown in the drawings and will herein be described in detail one or more embodiments with the understanding that this disclosure is to be considered an exemplification of the principles of the invention and is not intended to limit the invention to the illustrated embodiments. Aspects of the different embodiments can be combined with or substituted for one another.

As will be appreciated, terms such as "above" and "below", "upper" and "lower", "top" and "bottom," "front" and "back," (etc.), used as nouns, adjectives or adverbs refer in this description to the orientation of the container and vehicle as they are illustrated in the various figures. Such terms are not intended to limit the invention to a particular orientation.

Turning to the drawings, where like numerals indicate like elements, there is shown in FIG. 1 a rear perspective view of a land vehicle 50 that may have a custom molded container according to the disclosure installed therein. The land vehicle 50 comprises a passenger area 60 and a storage area 52 rearward of the passenger area 60 and separated from the passenger area 60 by a rear seat 68. The storage area 52 is defined by a deck or load floor 54, a roof 56 and opposing sides 58. The land vehicle 50 may comprise a hatch 70, shown in the open position in FIGS. 1 and 3, and a rear ledge 72 that extends vertically upward from the load floor 54. The load floor 54 extends rearward (toward the viewer) from immediately behind the rear seat 68 to the rear ledge 72.

The land vehicle 50 may further comprise a wheel well 62 extending above the load floor 54 and inward from one or both laterally opposing sides 58. Each of the one or more wheel wells 62 is substantially hump shaped to accommodate (provide clearance for) a wheel (not shown in the figures) located below the wheel well 62, and has a forward surface 63 facing the passenger area 60, a rearward surface 64 facing away from the passenger area 60, and a laterally inward surface 66.

Figure 2:
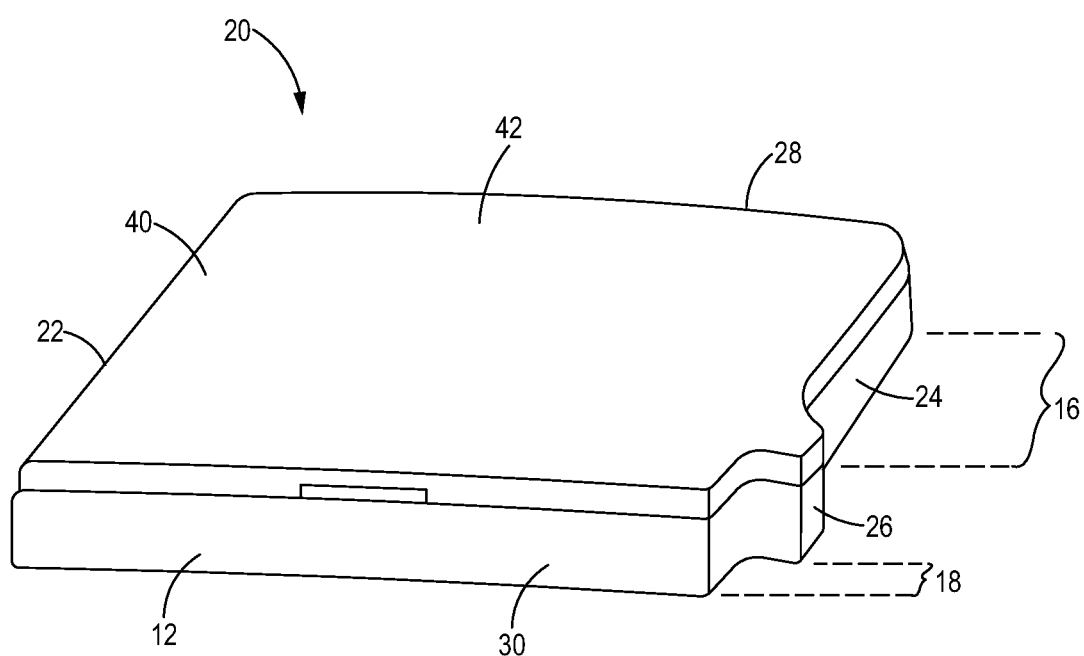
FIG. 2 is a perspective view of a container according to the disclosure.

FIG. 2 is a perspective view of a container 20 according to the disclosure. The container 20 may be a molded foam cooler for storing food and other items. The container 20 may be custom molded to fit the back of a particular SUV such as the land vehicle 50. Preferably the container 20 has the look and feel of an original part of the land vehicle 50.

More particularly, the container 20 comprises a body 12 and a lid 40 configured to engage the body 12 in sealing relationship therewith. The body 12 may define one or more compartments 14 (FIGS. 4 and 5) for holding items and have a lateral extension 26 extending from one or both sides of the container 20. The lateral extension 26 is configured to help prevent the container 20 from moving in either a lateral direction or a forward direction once the container 20 is installed within the storage area 52, as explained more fully below.

The body 12 may comprise a first or left sidewall 22, a second or right sidewall 24, a front or front facing side 28 located toward the passenger area 60 when the container 20 is stored in the storage area 52, and a rear or rear facing side 30. The body 12 may comprise a forward portion 16 generally defined as that portion of the body 12 forward of the lateral extension 26 and a rearward portion 18 generally defined as that portion of the body 12 rearward of the lateral extension 26. The body 12 may be configured to rest stably on the load floor 54 and to fit between the sides 58 of the storage area 52.

The lid 40 may be hingedly attached to the body 12, preferably to the forward portion 16 of the body 12 for easy access to the contents. Alternatively, the lid 40 may be a separate piece that fits snugly onto the body 12 to minimize heat transfer into or out of the container 20. The lid 40 may define a planar surface 42 upon which additional items may rest.

Figure 3:
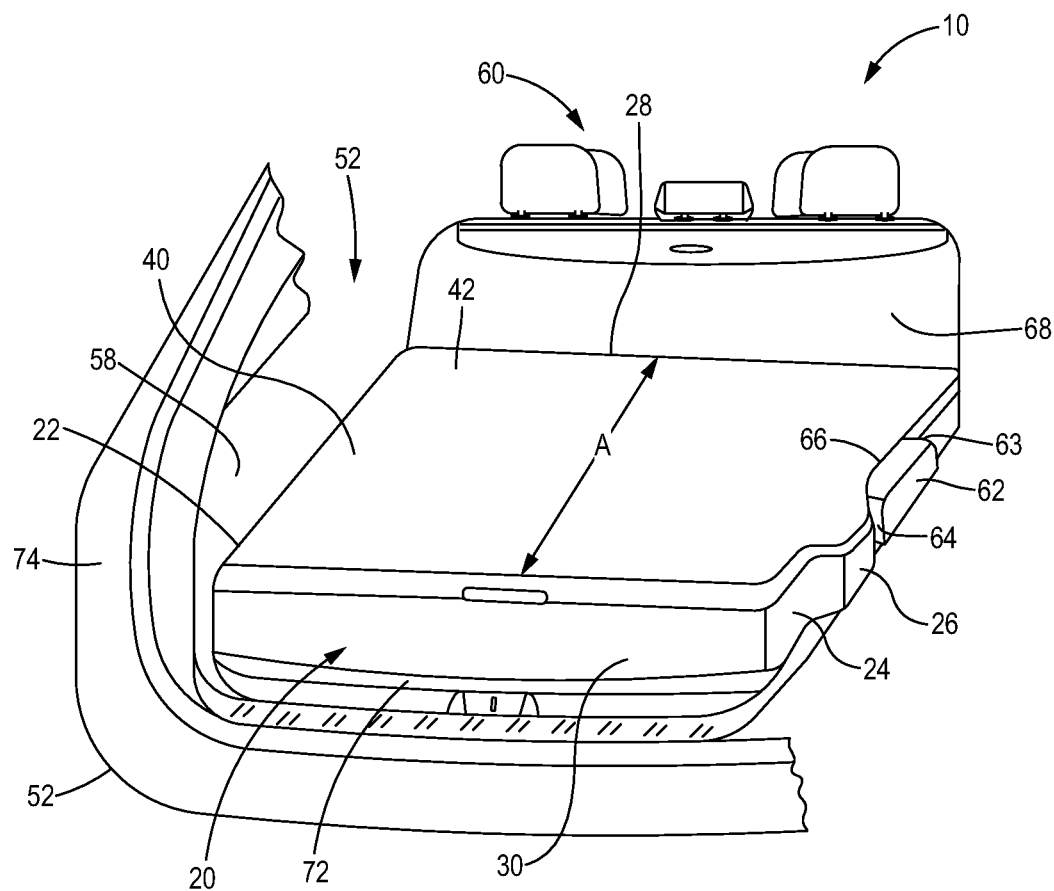
FIG. 3 is a partial perspective view of the container of FIG. 2 stored within a rear storage area of the land vehicle of FIG. 1.

FIG. 3 is a partial perspective view of a storage system 10 comprising the container 20 and the land vehicle 50 with the roof 56, the right side 58 and the hatch 70 removed to better illustrate the storage area 52 and the container 20. The container 20 is stored within the storage area 52 of the land vehicle 50, The container 20 is configured to be removably stored within the storage area 52.

For the purposes of this disclosure the axial direction is the direction indicted by axis (A) in Fitz. 3 and corresponding to the direction of forward or rearward movement of the land vehicle 50. The lateral direction is the side-to-side direction that is perpendicular to the axial direction.

The body 12 of the container 20 may have outward dimensions that directly engage the land vehicle 50 to prevent the container 20 from moving in either a lateral or axial direction when the container 20 is installed or otherwise stored within the storage area 52 as explained further below.

To minimize or eliminate lateral movement, the container 20 may be wedged in the lateral direction in one of a number of ways. For example, when the container 20 is installed within the storage area 52, the container 20 may have a width, measured as the distance from the left sidewall 22 to the right sidewall 24, such that the container 20 extends from one side 58 of the land vehicle 50 to the opposing side 58. That is, the container 20 may have a lateral dimension equal to or preferably just slightly less than the distance from one side 58 of the storage area 52 to the opposing side 58. The left sidewall 22 may abut the left side 58 of the land vehicle 50 while the right sidewall 24 abuts the right side 58 of the land vehicle 50. As a result, the container 20 will be wedged between the opposing sides 58, minimizing or eliminating the possibility of lateral movement.

Alternatively, the container 20 may extend from one side 58 of the land vehicle 50 to the wheel well 62 on the opposing side 58. For example, the left sidewall 22 may abut the left side 58 of the land vehicle 50 while the right sidewall 24 abuts the laterally inward surface 66 of the wheel well 62 located on the right side 58 of the land vehicle 50. Or the right sidewall 24 may abut the right side 58 of the land vehicle 50 while the left sidewall 22 abuts the laterally inward surface 66 of the wheel well 62 located on the left side 58 of the land vehicle 50.

In another alternative, the container 20 may extend from one wheel well 62 to the other wheel well 62. In short, the container 20 may be wedged between the wheel wells 62. Thus, the left sidewall 22 abuts the wheel well 62 located on the left side 58 of the land vehicle 50 and the right sidewall 24 abuts the wheel well 62 located on the right side 58 of the land vehicle 50.

To minimize or eliminate axial movement, the container 20 may be wedged in the axial direction in one of a number of ways. In one embodiment, the container 20 has an axial dimension, defined as the distance between the front side 28 and the rear side 30, such that the container 20 is wedged between the rear seat 68 and the rear ledge 72 of the land vehicle 50.

Alternatively, the rearward portion 18 of the container 20 may have an axial dimension such that the lateral extension 26 abuts the rearward surface 64 of the wheel well 62 and the rear side 30 abuts the rear ledge 72, as shown in FIG. 3. The lateral extension 26 must extend laterally beyond the laterally inward surface 66 of the wheel well 62. Preferably the lateral extension 26 abuts the rearward surface 64, The rearward surface 64 of the wheel well 62 prevents the container 20 from sliding or otherwise moving forward and the rear ledge 72 prevents the container 20 from moving rearward. In this way, the container 20 has limited or negligible movement in either axial direction.

In another alternative, the forward portion 16 of the container 20 may have an axial dimension such that the lateral extension 26 abuts the forward surface 63 of the wheel well 62 and the front side 28 abuts the rear seat 68. The lateral extension 26 must extend laterally beyond the laterally inward surface 66 of the wheel well 62. Preferably the lateral extension 26 abuts the forward surface 63. The forward surface 63 of the wheel well 62 prevents the container 20 from sliding or otherwise moving rearward and the rear seat 68 prevents the container 20 from moving forward. In this way, the container 20 has limited or negligible movement in either axial direction.

Figure 4:
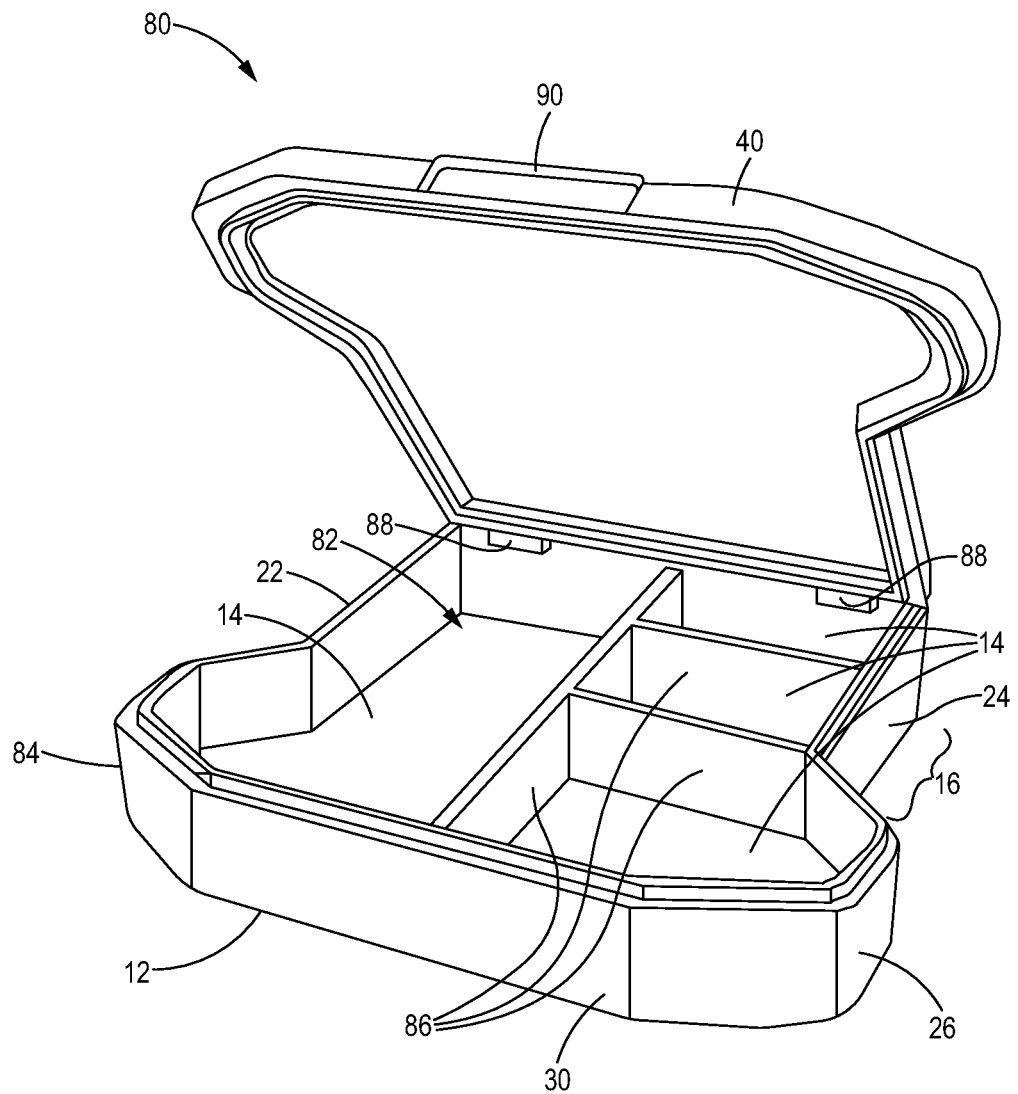
FIG. 4 is a perspective view of an alternative embodiment of a container according to the disclosure in an open position.

FIG. 4 illustrates an alternative embodiment of a container 80 according to the disclosure with the lid 40 open to illustrate an interior 82 of the container 80. Structures of the container 80 corresponding to structures of the container 20 discussed above are identified with the same reference numerals. The container 80 may be configured for installation in a land vehicle 50 having wheel wells 62 extending into the storage area 52 from both sidewalls 22, 24. The container 80 includes a second lateral extension 84 extending outward from the left sidewall 22 proximate the rear side 30 of the container 80. The container 80 may have a lateral width between the sidewalls 22, 24 that is slightly less than the distance between the lateral inward surfaces 66 of the wheel wells 62. At the same time, the lateral width between the outer edges of the lateral extensions 26, 84 is slightly less than the distance between the sides 58 of the storage area 52. The container 80 is installed in the storage area 52 with the lateral extensions 26, 84 inserted between the rearward surfaces 64 of the wheel wells 62 in the rear ledge 72, thereby minimizing or eliminating axial and lateral movement of the container 80 within the storage area 52. In alternative embodiments, one or both of the lateral extensions 26, 84 may be formed to be inserted forward of the wheel wells 62, or may have forward lateral extensions in addition to the rearward lateral extensions 26, 84.

The interior 82 of the container 80 includes a plurality of compartments 14 to divide the interior 82 for separate storage of different items. For example, beverages may be stored on ice in one of the compartments 14 wall food is stored in other compartments 14. The container 100 may be fabricated so that the dividing walls 86 fluidly and, if desired, thermally isolate the compartments 14 from each other so that liquid does not flow between compartments 14 and cold items do not cool down hot items, and vice versa. The container 80 further illustrates the lid 40 being pivotally attached to the body 12 by hinges 88. A handle 90 may be formed in or attached to the lid 40 to allow an operator of the land vehicle 50 to open and close the lid 40.

Figure 5:
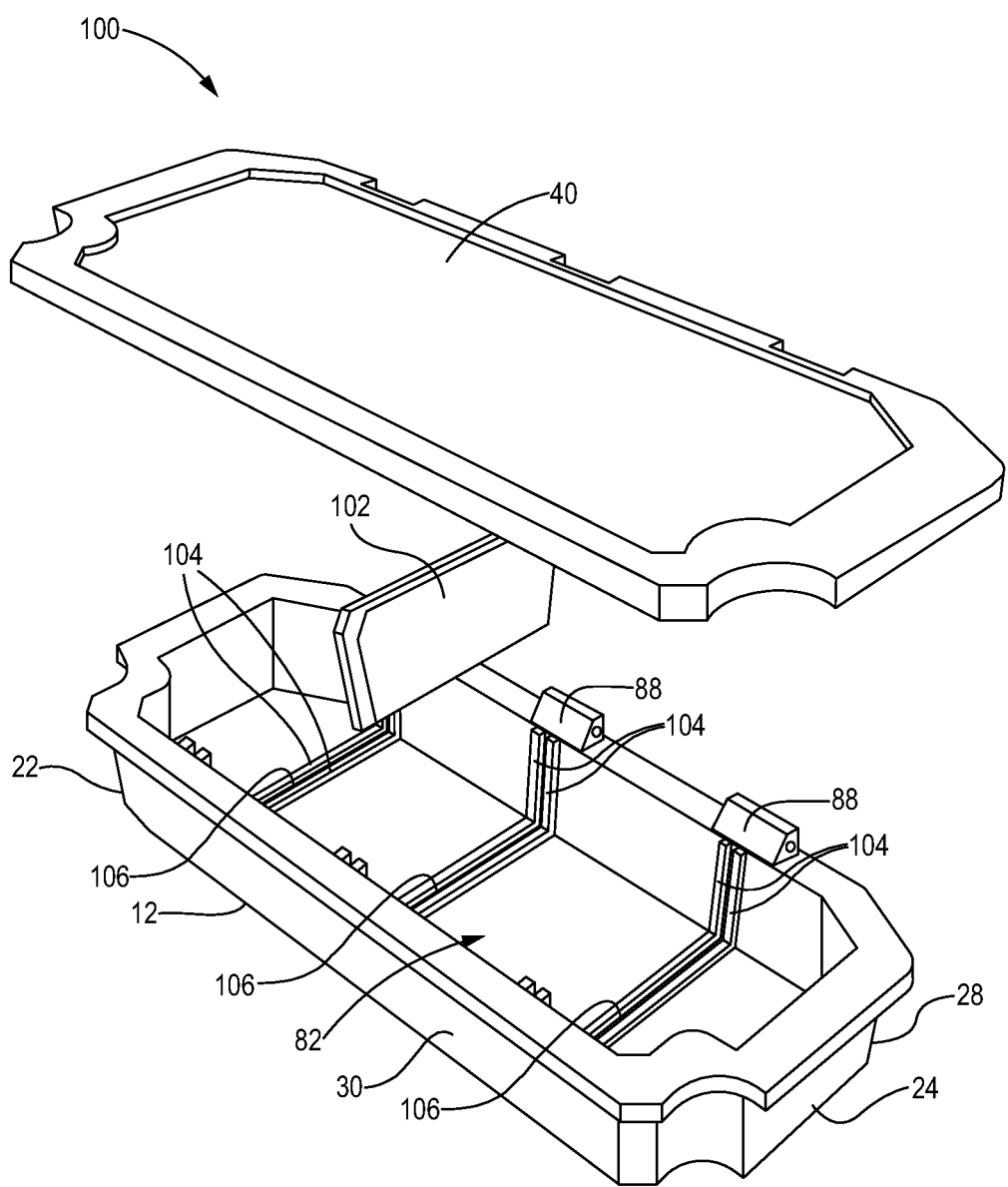
FIG. 5 is a perspective view of a further alternative embodiment of a container according to the disclosure with a lid detached from a body of the container.

FIG. 5 illustrates a further alternative embodiment of a container 100 according to the disclosure for smaller storage areas 52, or for only occupying a portion of a storage area 52. The container 100 has a shorter axial depth between the front side 28 and the rear side 30 so the container 100 may be inserted between the rear ledge 72 and the rearward surfaces 64 of the wheel wells 62, Alternatively, the container 100 may be inserted between the rear seat 68 and the forward surfaces 63 of the wheel wells 62. The hinges 88 may be snap hinges that facilitate detachable connection of the lid 40 to the body 12 for removal if necessary for loading and removing items in the compartments 14 and cleaning the interior 82, Within the interior 82, the size of the compartments 14 may be adjustable to vary the size and number. One or more detachable dividing walls 102 may be inserted between any of a plurality of pairs of dividing ribs 104 and received by dividing channels 106 to define the compartments 14 of the interior 82. The dividing walls 102 may snap in place and be engaged by the dividing ribs 104 to form fluid- and/or thermal-tight seals. The container 100 offers flexibility to create different numbers and sizes of compartments 14 in the interior 82 4 different types of items to be stored therein.

INDUSTRIAL APPLICABILITY

Herein, containers 20, 80, 100 have been described that can be installed and removed from the storage areas 52 of land vehicles 50. The containers 20, 80, 100 rest on the load floors 54 and define one or more compartments 14 for storing goods, while the lids 40 allow for storage on top of the containers 20, 80, 100. The containers 20, 80, 100 have outward dimensions that directly engage structures in the storage areas 52 of the land vehicles 50 to prevent the containers 20, 80, 100 from substantially moving in either lateral or forward/rearward directions. The containers 20, 80, 100 may be made of lightweight foam, such as expanded polypropylene (EPP), other plastics or other materials from which coolers are typically constructed, and can easily be removed by the owners of the land vehicles 50 if required. This construction provides flexibility in configuration of the containers 20, 80, 100 so that they may be custom shaped to match the profile of the storage area 52 of a particular make and model of land vehicle 50 in which the containers 20, 80, 100 are to be installed.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with single meaning, that is done for sake of clarity only so as to not confuse the reader, and it is not intended that such claim term be limited, by implication or otherwise, to that single meaning.

What is claimed is:

1. A storage system for a land vehicle, the storage system comprising:
   a storage area disposed in the land vehicle behind a passenger area, the storage area defined by a load floor, a roof, a first laterally opposing side, a second laterally opposing side, a rear seat and a rear ledge; and
   a container comprising a body and a lid configured to engage the body in sealing relationship therewith, the body defining an interior of the container providing storage space, the body having a forward portion located toward the passenger area and a rearward portion located away from the passenger area, the body configured to rest on the load floor and to fit between the first laterally opposing side and the second laterally opposing side of the storage area, wherein the body has outward dimensions so that the body is prevented from moving in an axial direction and a lateral direction when the container is installed within the storage area;
   wherein the body further comprises a first sidewall, a second sidewall and a first lateral extension projecting laterally from the first sidewall, the first lateral extension configured to prevent the container from moving in at least one of a first lateral direction toward the first laterally opposing side and an axially forward direction toward the passenger area when the container is installed within the storage area.

2. The storage system of claim 1, wherein the lid defines a planar surface upon which articles may rest.

3. The storage system of claim 1, wherein the container is configured to be removably stored within the storage area.

4. The storage system of claim 1, wherein the first lateral extension is integrally formed with the body.

5. The storage system of claim 4, further comprising a first wheel well extending inward from the first laterally opposing side, the first wheel well having a first laterally inward surface and a first rearward surface proximate the rear ledge, wherein the first lateral extension is engaged by the first rearward surface to prevent axially forward movement of the container.

6. The storage system of claim 5, wherein at least one of the rear side of the body and the first lateral extension is engaged by the rear ledge to prevent an axial rearward movement of the container.

7. The storage system of claim 5, wherein the first lateral extension extends past the first wheel well and is engaged by the first laterally opposing side to prevent lateral movement of the container toward the first laterally opposing side.

8. The storage system of claim 5, wherein the first sidewall is engaged by the first laterally inward surface of the first wheel well to prevent lateral movement of the container toward the first laterally opposing side.

9. The storage system of claim 4, wherein the body further comprises a second lateral extension projecting laterally from the second sidewall, the second lateral extension configured to prevent the container from moving in at least one of a second lateral direction toward the second laterally opposing side and the axially forward direction toward the passenger area when the container is installed within the storage area.

10. The storage system of claim 1, wherein the body comprises a dividing wall dividing the interior into a plurality of compartments.

11. The storage system of claim 10, wherein the dividing wall is detachable, wherein the body comprises a dividing channel, and wherein the dividing wall is engaged by the dividing channel when the dividing wall is inserted into the dividing channel to divide the interior into the plurality of compartments.

12. A container for a land vehicle, the land vehicle having a storage area disposed in the land vehicle behind a passenger area, the storage area defined by a load floor, a roof, a first laterally opposing side, a second laterally opposing side, a rear seat and a rear ledge, the container comprising:
  a body having a first sidewall, a second sidewall opposite the first sidewall, a front side and a rear side, and defining an interior of the container providing storage space, wherein the body is configured to rest on the load floor and to fit between the first laterally opposing side and the second laterally opposing side of the storage area with the front side disposed proximate the rear seat and the rear side disposed near the rear ledge, wherein the body has outward dimensions so that the body is prevented from moving in an axial direction and a lateral direction when the container is installed within the storage area; and
  a lid pivotally connected to the body at the front side and configured to engage the body in sealing relationship therewith;
  wherein the body comprises a first lateral extension projecting laterally from the first sidewall, the first lateral extension configured to prevent the container from moving in at least one of a first lateral direction toward the first laterally opposing side and an axially forward direction toward the passenger area when the container is installed within the storage area.

13. The container of claim 12, wherein the first lateral extension is integrally formed with the body.

14. The container of claim 13, wherein the storage area of the land vehicle has a first wheel well extending inward from the first laterally opposing side, the first wheel well having a first laterally inward surface and a first rearward surface proximate the rear ledge, wherein the first lateral extension projects laterally past the first wheel well and is engaged by the first rearward surface to prevent axially forward movement of the container.

15. The container of claim 14, wherein at least one of the rear side of the body and the first lateral extension is engaged by the rear ledge to prevent an axial rearward movement of the container.

16. The container of claim 14, wherein the first lateral extension extends past the first wheel well and is engaged by the first laterally opposing side to prevent lateral movement of the container toward the first laterally opposing side.

17. The container of claim 14, wherein the first sidewall is engaged by the first laterally inward surface of the first wheel well to prevent lateral movement of the container toward the first laterally opposing side.

18. The container of claim 13, wherein the body further comprises a second lateral extension projecting laterally from the second sidewall, the second lateral extension configured to prevent the container from moving in at least one of a second lateral direction toward the second laterally opposing side and the axially forward direction toward the passenger area when the container is installed within the storage area.

19. A container for a land vehicle, the land vehicle having a storage area disposed in the land vehicle behind a passenger area, the storage area defined by a load floor, a roof, a first laterally opposing side, a second laterally opposing side, a rear seat and a rear ledge, wherein the first laterally opposing side has a first wheel well extending inward therefrom and having a first laterally inward surface and a first rearward surface proximate the rear ledge, the container comprising:
  a body having a first sidewall, a second sidewall opposite the first sidewall, a front side and a rear side, and defining an interior of the container providing storage space, wherein the first sidewall has a first lateral extension projecting laterally therefrom, wherein the body is configured to rest on the load floor and to fit between the first laterally opposing side and the second laterally opposing side of the storage area with the front side disposed proximate the rear seat and the rear side disposed near the rear ledge, wherein the first lateral extension engages the first laterally opposing side and the second sidewall engages the second laterally opposing side to prevent lateral movement of the body within the storage area, and wherein the first lateral extension projects laterally past the first wheel well and engages the first rearward surface to prevent axially forward movement of the container within the storage area; and
  a lid pivotally connected to the body at the front side and configured to engage the body in sealing relationship therewith.

20. The container of claim 19, wherein the rear side of the body engages the rear ledge to prevent axial rearward movement of the container.

* * * * *